US011007925B2

(12) United States Patent
Weghaus et al.

(10) Patent No.: US 11,007,925 B2
(45) Date of Patent: May 18, 2021

(54) ASSISTANCE METHOD FOR A LIGHT CONTROL SYSTEM IN A MOTOR VEHICLE, LIGHT CONTROL SYSTEM, COMPUTER PROGRAM PRODUCT, AND COMPUTER-READABLE MEDIUM

(71) Applicant: Hella GmbH & Co. KGaA, Lippstadt (DE)

(72) Inventors: Ludger Weghaus, Lippstadt (DE); Lars-Peter Becker, Berlin (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/681,386

(22) Filed: Nov. 12, 2019

(65) Prior Publication Data

US 2020/0079276 A1    Mar. 12, 2020

Related U.S. Application Data

(63) Continuation of application No. PCT/EP2018/061517, filed on May 4, 2018.

(30) Foreign Application Priority Data

May 11, 2017    (DE) ..................... 10 2017 110 232.9

(51) Int. Cl.
*B60Q 1/08*    (2006.01)
*B60Q 1/04*    (2006.01)
(Continued)

(52) U.S. Cl.
CPC .............. *B60Q 1/08* (2013.01); *B60Q 1/045* (2013.01); *B60Q 1/245* (2013.01); *B60Q 1/28* (2013.01);
(Continued)

(58) Field of Classification Search
CPC ........ B60Q 1/08; B60Q 1/26; B60Q 2400/40; B60Q 2900/30; B60Q 1/045; B60Q 1/085;
(Continued)

(56) References Cited

U.S. PATENT DOCUMENTS 9,174,650 B2    11/2015 Reilhac
9,604,568 B1    3/2017 Salter et al.
(Continued)

FOREIGN PATENT DOCUMENTS

DE    100 34 379 A1    1/2002
DE    103 38 756 A1    3/2005
(Continued)

OTHER PUBLICATIONS

International Search Report for International Application No. PCT/EP2018/061528 dated Sep. 26, 2018.
(Continued)

*Primary Examiner* — Monica C King
(74) *Attorney, Agent, or Firm* — Muncy, Geissler, Olds & Lowe, P.C.

(57) ABSTRACT

An assistance method for a light control system in a motor vehicle, having a light controller for controlling a lighting unit in the motor vehicle for lighting a motor vehicle environment, a portable unit, at least one communication interface, and an evaluation unit for evaluating signals from the portable unit received via the communication interface. The lighting unit being controllable by the light controller and in accordance with the evaluation of the signals received from the portable unit in a first assistance function, such that at least one light beam emitted by the lighting unit can be positioned as a function of the position of the portable unit. The lighting unit is controlled via the light controller, such that when the first assistance function is switched on, the
(Continued)

light beam emitted by the lighting unit automatically tracks the portable unit in accordance with the motion trajectory of the portable unit.

17 Claims, 1 Drawing Sheet

(51) Int. Cl.
*B60Q 1/24* (2006.01)
*B60Q 1/28* (2006.01)
*G06K 9/00* (2006.01)
*H05B 47/19* (2020.01)
*H05B 47/105* (2020.01)
*H05B 47/17* (2020.01)

(52) U.S. Cl.
CPC ....... *G06K 9/00845* (2013.01); *H05B 47/105* (2020.01); *H05B 47/17* (2020.01); *H05B 47/19* (2020.01); *B60Q 2400/40* (2013.01); *B60Q 2900/30* (2013.01)

(58) Field of Classification Search
CPC . B60Q 1/18; B60Q 1/24; B60Q 1/245; B60Q 1/28; B60Q 2300/056; H05B 47/105; H05B 47/17; H05B 47/19
See application file for complete search history.

(56) References Cited

U.S. PATENT DOCUMENTS

| | | |
|---|---|---|
| 10,300,887 B2 | 5/2019 | Haupt et al. |
| 2006/0235753 A1 | 10/2006 | Kameyama |
| 2007/0030136 A1 | 2/2007 | Teshima et al. |
| 2016/0096466 A1 | 4/2016 | Okumura et al. |
| 2017/0021805 A1* | 1/2017 | Haupt ..................... B60R 25/24 |
| 2017/0106793 A1* | 4/2017 | Kumar ................... B60Q 9/005 |

FOREIGN PATENT DOCUMENTS

| | | |
|---|---|---|
| DE | 10 2009 048 493 A1 | 4/2011 |
| DE | 11 2014 002 482 T5 | 2/2016 |
| EP | 2 384 936 A1 | 11/2011 |
| EP | 3 121 068 A1 | 1/2017 |
| JP | 2008-149784 A | 7/2008 |

OTHER PUBLICATIONS

BMW Deutschland, "BMW ConnectDrive: BMW Remote App", YouTube, at https://www.youtube.com/watch?v=L4xIxQ6ETjA, p. 1 (Mar. 18, 2011).

* cited by examiner

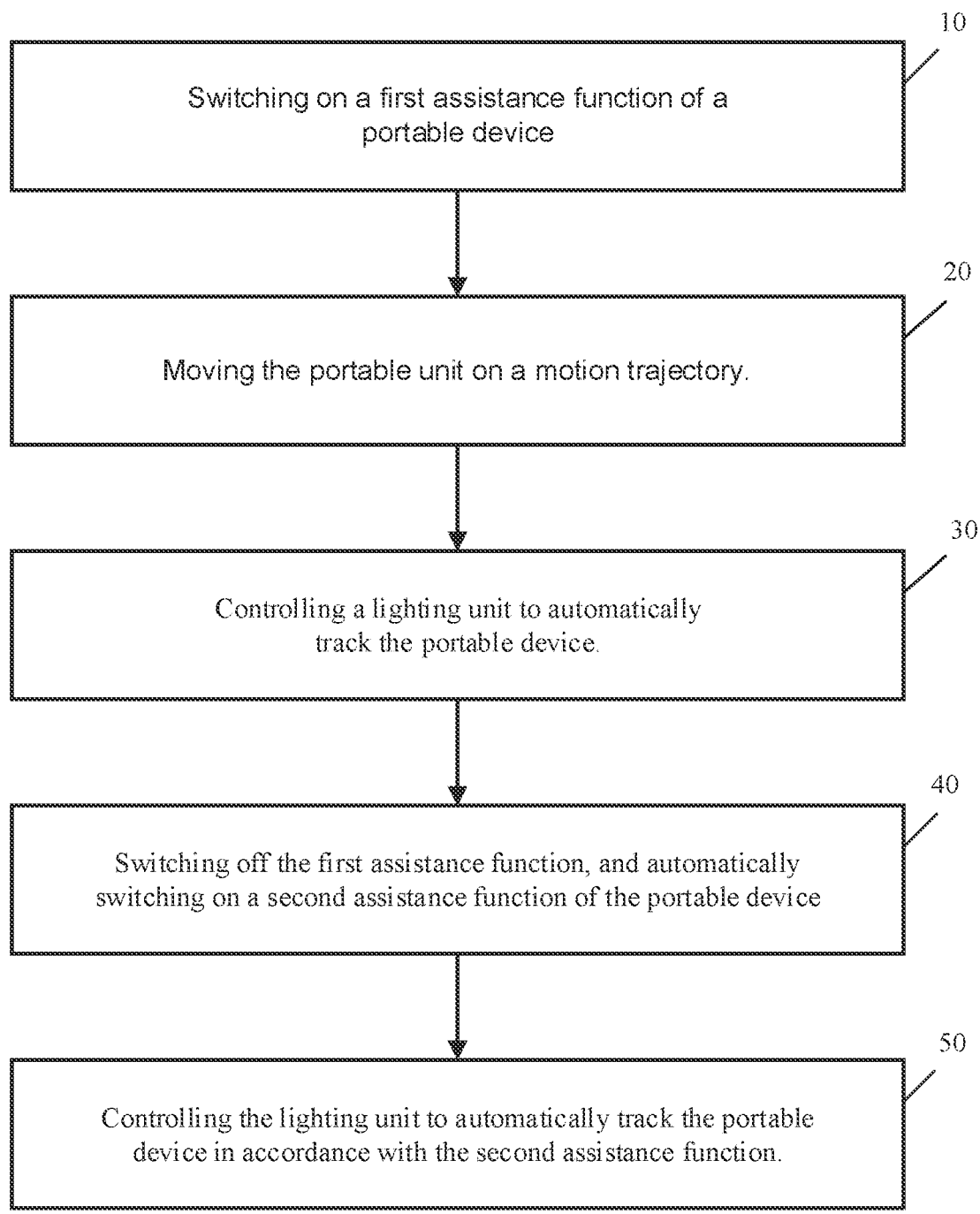

ASSISTANCE METHOD FOR A LIGHT CONTROL SYSTEM IN A MOTOR VEHICLE, LIGHT CONTROL SYSTEM, COMPUTER PROGRAM PRODUCT, AND COMPUTER-READABLE MEDIUM

This nonprovisional application is a continuation of International Application No. PCT/EP2018/061517, which was filed on May 4, 2018, and which claims priority to German Patent Application No. 10 2017 110 232.9, which was filed in Germany on May 11, 2017 and which are both herein incorporated by reference.

BACKGROUND OF THE INVENTION

Field of the Invention

The present invention relates to an assistance method for a light control system in a motor vehicle, to a light control system for carrying out an assistance method, to a computer program product, and to a computer-readable medium.

Description of the Background Art

Assistance methods for a light control system in a motor vehicle, light control systems for their implementation, computer program products, and computer-readable media are already known from the prior art in numerous design variants.

For example, a light control system in a motor vehicle is known from DE 10 2012 224 465 A1, which corresponds to U.S. Pat. No. 9,150,143, which includes a light controller for controlling a lighting unit in the motor vehicle for lighting a motor vehicle environment, a portable unit, at least one communication interface, and an evaluation unit for evaluating signals received via the communication interface from the portable unit. When a control button of the portable unit is pressed continuously, the lighting unit is controlled such that a light beam emitted by the lighting unit can be positioned depending on the position of the portable unit.

SUMMARY OF THE INVENTION

It is therefore an object of the present invention to provide assistance to a user of the portable unit, said assistance being better adapted to the requirements of the individual case, via a light controller for a lighting unit in a motor vehicle.

An advantage of the invention is in particular that, depending on the requirements of the individual case, an advantageous lighting, for example, of the direct environment of the portable unit and thereby of a user of the portable unit is made possible. The at least one light beam emitted by the lighting unit automatically tracks the portable unit and thus the user, therefore, the carrier of the portable unit. Due to this dynamic in the orientation of the at least one light beam emitted by the lighting unit, the user of the portable unit, for example, the driver of the motor vehicle, is optimally assisted by the lighting unit of the motor vehicle, also during the movement of the portable unit in the motor vehicle environment. Switching on the first assistance function can also be dependent on additional motor vehicle-related and/or environment-related conditions.

The wording that the light beam emitted by the lighting unit automatically tracks or can track the portable unit in accordance with the motion trajectory of the portable unit, as well as the term "light beam" can be understood in general terms here. Tracking therefore does not just mean following the light beam but includes any kind of orientation of the light beam emitted by the lighting unit in accordance with the motion trajectory of the portable unit. The light beam can thus also be guided in front of or to the side of the portable unit and thus in front of or to the side of the user of the portable unit. The term "light beam" likewise comprises light bundles composed of individual light beams and overall light distributions generated by the lighting unit of the motor vehicle.

A particularly advantageous refinement of the assistance method of the invention provides that the first assistance function can be switched off manually and/or automatically, wherein the light control system automatically switches on a second assistance function when the first assistance function is switched off. This makes it possible to switch on the second assistance function without further operating steps. Switching on the second assistance function can also be dependent on additional motor vehicle-related and/or environment-related conditions.

The same applies to an advantageous refinement of the light control system of the invention, according to which the first assistance function can be switched off manually and/or automatically, wherein a second assistance function can be switched on automatically when the first assistance function is switched off.

A particularly advantageous refinement of the last-mentioned embodiment of the assistance method of the invention provides that, when the second assistance function is switched on, the light beam emitted by the lighting unit moves automatically as a function of the portable unit being actuated at a time that follows the switching on of the second assistance function. It is possible in this way to remotely control by means of the portable unit the at least one light beam emitted by the lighting unit independently of the motion trajectory of the portable unit and thus independently of the motion trajectory of the user carrying the portable unit.

The same applies to an advantageous refinement of the light control system of the invention, according to which when the second assistance function is switched on, the light beam emitted by the lighting unit can move automatically depending on the portable unit being actuated at a time that follows the switching on of the second assistance function.

A further particularly advantageous refinement of the assistance method of the invention provides that the light beam emitted by the lighting unit tracks the portable unit when the first assistance function is switched on and/or moves when the second assistance function is switched on such that a carrier of the portable unit is not dazzled. This ensures that the carrier of the portable unit, therefore, the user, is not hindered by the first and/or second assistance function.

In principle, the signal exchange between the portable unit and the at least one communication interface can be freely selected within wide suitable limits according to type and function. Advantageously, the signal exchange between the portable unit and the at least one communication interface takes place automatically. The signal exchange therefore does not need to be initiated or maintained by an operational action of the user. It is particularly advantageous if the signal exchange is designed as a passive signal exchange.

An advantageous refinement of the aforementioned embodiment provides that the signal exchange from the at least one communication interface to the portable unit and/or the signal exchange from the portable unit to the at least one communication interface take place based on a magnetic field technology or based on acoustic signals. Such technologies are often already present in existing systems; for example, magnetic field technology is typically implemented in automotive access systems, and acoustic systems are commonly found in mobile consumer electronic devices such as smartphones or the like.

A further advantageous refinement of the light control system of the invention provides that the portable unit is designed as a UID and the lighting unit as at least one front headlight and/or at least one sidelight and/or at least one backup light of the motor vehicle. In this way, the use of already existing components and assemblies for the light control system of the invention is improved further. The abbreviation "UID" stands for user identification device, therefore, a device by means of which a user authorized to use the motor vehicle can be identified. The portable unit, formed as a UID, thus ensures that the user of the portable unit is authorized, for example, to make adjustments to the motor vehicle.

The assistance method of the invention, the light control system of the invention for carrying out the assistance method, and a corresponding computer program product and a computer-readable medium on which the computer program product is stored are explained in more detail below.

FIG. 1 is a flow diagram of a process according to an implementation of the invention.

At 10, a first assistance function of a portable device is switched on. At 20, the portable unit moves on a motion trajectory. At 30, a lighting unit is controlled to automatically track the portable device. At 40, the first assistance function is switched off, and a second assistance function of the portable device is automatically switched on. At 50, a lighting unit is controlled to automatically track the portable device in accordance with the second assistance function.

The light control system of the present exemplary embodiment comprises a light controller for controlling a lighting unit of a motor vehicle, designed as a front headlight pair, for lighting a motor vehicle environment, a portable unit designed as a UID, a communication interface, and an evaluation unit for evaluating signals from the UID received via the communication interface. The light controller, the communication interface, and the evaluation unit are integrated into the motor vehicle. The front headlights of the motor vehicle can be controlled by the light controller and in accordance with the evaluation of the signals received from the portable unit, such that a light beam formed as an overall light distribution of the front headlights can be positioned in accordance with the position of the UID. The two front headlights each have a matrix of a plurality of individual light sources with optical attachments, by means of which the overall light distribution of the front headlights can be generated in a manner known to the skilled artisan.

Furthermore, the motor vehicle has an access system by means of which doors of the motor vehicle can be unlocked and locked by means of the UID in a manner known to the skilled artisan. The access system is designed as a so-called passive entry system, in which the user only has to carry the UID with him in order to unlock or lock the motor vehicle doors. Therefore, the user does not need to actively operate the UID to unlock or lock motor vehicle doors. For this purpose, the motor vehicle has, inter alia, a plurality of LF antennas which, when energized cyclically, each generate a magnetic field in the vicinity of the motor vehicle, which can be measured by means of a 3D receiving coil of the UID. As a function of this measurement, the UID generates a signal which can be received via the communication interface of the motor vehicle and forwarded to the evaluation unit.

When the UID is used by a user, for example, the driver of the motor vehicle, it is first automatically checked in a manner known to the skilled artisan whether the UID corresponds to the motor vehicle. Once this has occurred and the UID has been identified as belonging to the motor vehicle, the assistance method of the invention explained below can take place.

If the UID is located in the environment outside the motor vehicle, this will be detected by the light control system. Thereupon, the light control system automatically switches on a first assistance function. The user therefore does not need to operate a control button of the UID in order to start the first assistance function. When the first assistance function is switched on, both front headlights are switched on and controlled by means of the light controller of the motor vehicle such that the overall light distribution of the front headlights automatically tracks the UID in accordance with the UID motion trajectory. The tracking of the overall light distribution in the present exemplary embodiment is carried out when the UID and thus the user carrying the UID approach the motor vehicle from the front or diagonally from the front, such that the overall light distribution lights the ground in front of the user.

When the UID and thus the user move forward or diagonally forward from the motor vehicle, the tracking of the overall light distribution is such that the overall light distribution illuminates the user from behind. Accordingly, in the latter case, the ground is also illuminated in front of the user who is moving away from the motor vehicle. If the UID and thus the user move transversely in front of the motor vehicle, the tracking then takes place such that the overall light distribution lights the ground between the motor vehicle and the user. In all three cases mentioned above, the overall light distribution follows the UID and thus the user constantly; the overall light distribution is tracked continuously.

The front headlights are controlled such that the carrier of the UID, therefore, the user of the UID, is not dazzled.

For the above-described tracking of the overall light distribution of the two front headlights, the plurality of LF antennas of the access system of the motor vehicle is energized cyclically, so that the LF antennas each generate a magnetic field in the vicinity of the motor vehicle. These magnetic fields are measured by the 3D receiving coil of the UID. As a function of this measurement, the UID generates a signal which is transmitted by radio to the communication interface of the motor vehicle, received by it, and forwarded to the evaluation unit of the motor vehicle.

Depending on whether the evaluation unit by means of the evaluation detects that the UID and thus the user of the motor vehicle are located in the front region of the motor vehicle, therefore, in the effective range of the two front headlights, the light controller of the light control system controls the two front headlights such that the above-explained overall light distribution of the front headlights results.

However, it is also conceivable to control only individual light sources of the light sources matrix with the optical attachments of both or only one of the two front headlights. If the UID and thus the user are located, for example, diagonally to the left in front of the motor vehicle, it is possible that only at least one light source of the left front headlight is switched on. In an analogous manner, it is possible that only at least one light source of the right front headlight is switched on, if the UID and thus the user are located, for example, diagonally to the right in front of the motor vehicle. If the UID and thus the user are located rather centrally in front of the motor vehicle, in contrast, at least one light source of both front headlights could be switched on. Of course, it is conceivable that instead of switching on one or more light sources of at least one of the two front headlights, other suitable measures known to the skilled artisan are taken to illuminate the environment in the desired manner.

By way of example, reference is merely made here to the various possibilities that result from the use of at least one optical attachment in the respective front headlights.

In the present exemplary embodiment, it is provided further that the first assistance function can be switched off manually or automatically, wherein the light control system automatically switches on a second assistance function when the first assistance function is switched off. For example, it is conceivable that the first assistance function is switched off manually by actuating a control button of the UID. The actuation can be designed such that the user of the UID presses the control button three times in quick succession. As soon as the first assistance function has been switched off in this way, the second assistance function is automatically switched on. The user does not need to perform any additional operating step. The second assistance function is designed such that, when the second assistance function is switched on, the overall light distribution of the front headlights can be moved automatically as a function of the portable unit being actuated at a time that follows the switching on of the second assistance function.

For example, the user of the UID can manually control the overall light distribution of the front headlights by means of the light control system such that the front headlights serve as a type of construction light for lighting a work area in the front area, therefore, diagonally in front of or centrally in front of the front headlights.

To operate the UID for remote control of the front headlights, it is provided with the second assistance function turned on that the user of the UID can manually direct the overall light distribution of the front headlights by changing the UID position. For this purpose, in the present exemplary embodiment, the user presses the control button of the UID continuously and pivots the UID by hand about one of the three axes of the UID, namely about the longitudinal axis, the transverse axis, or the vertical axis of the UID. The changes in the UID position brought about in this way are detected by means of an acceleration sensor integrated in the UID, evaluated in the UID, transmitted to the communication interface of the motor vehicle in the manner explained above, evaluated in the evaluation unit of the motor vehicle, and used to control the front headlights by means of the light controller.

In order to make it easier for even inexperienced users to carry out the above-described actuation of the UID, it can be provided that appropriate instructions, such as pictograms or the like, are provided on the UID in a manner known to the skilled artisan. It can also be achieved hereby that the user of the UID also orients it correctly relative to the motor vehicle, thus, for example, by holding it the right way around in the hand.

For example, if the user pivots the UID to the left about the longitudinal axis, the user directs the overall light distribution of the two front headlamps to the left. Pivoting the UID about the longitudinal axis of the UID to the right directs the overall light distribution of the two front headlights to the right. For example, if the user pivots the UID forwards and downwards about the transverse axis, the user directs the overall light distribution of the two front headlamps downwards. Pivoting the UID about the transverse axis of the UID forwards and upwards directs the overall light distribution of the two front headlights upwards. For example, if the user pivots the UID to the left about the vertical axis, then the user focuses the overall light distribution of the two front headlights, whereas pivoting the UID about the vertical axis to the right widens the overall light distribution of the two front headlights. Of course, it is also conceivable that the pivoting of the UID about the respective axes of the UID occurs not successively but simultaneously about at least two of the axes of the UID. As soon as the user has set the overall light distribution as desired in the aforementioned manner, the user again releases the UID control button. The setting process is finished, and the overall light distribution remains as set, therefore, static, regardless of the motion trajectory of the UID and thus the movement of the user of the UID.

As in the case of the first assistance function, glare suppression can also be provided for the user in the case of the second assistance function. For example, by cutting the closer surroundings of the UID and thus the user out of the overall light distribution in a manner known to the skilled artisan, therefore, the position of the UID and thus the user of the UID are not directly illuminated by the front headlights. With this expansion of the second assistance function, a dynamic overall light distribution of the front headlights of the motor vehicle would thus be realized again.

If the user again presses the control button of the UID three times in quick succession, the second assistance function is switched off manually and the first assistance function is switched on automatically at the same time. The rest of the procedure is as already explained above.

In addition, a computer program product can be provided that comprises instructions that cause the light control system to execute the steps of the assistance method.

Furthermore, a computer-readable medium can be provided on which the computer program product is stored.

The invention is not limited to the present exemplary embodiment. For example, the first assistance function can also be switched on manually and/or switched off automatically. In addition, depending on the application, the second assistance function can be designed differently according to type and function. The second assistance function can also be switched on manually and/or switched off automatically. The lighting unit can also be some other exterior lighting of the motor vehicle, such as, for example, sidelights or backup lights. These can also be designed in combination as a lighting unit of the invention.

For example, a lighting unit comprising two front headlights, two sidelights, namely one sidelight on each side of the vehicle, and at least one backup light, would result in the possibility that when the first assistance function is switched on, in accordance with the motion trajectory of the portable unit, the light beam emitted by the lighting unit can automatically track the portable unit in a 360° environment around the motor vehicle. Similarly, it would also be conceivable that the light beam emitted by the lighting unit can be moved automatically around the motor vehicle in a 360° environment when the second assistance function is switched on as a function of actuation of the portable unit. In addition, the lighting unit can also be designed as an auxiliary headlight, which is integrated or mounted, or as some other exterior lighting of the motor vehicle.

The light beam in this case can be designed not only as an overall light distribution of the lighting unit used in each case. For example, it is also conceivable that only individual light sources of the lighting unit, with or without optical attachments, are used and controlled for the first assistance function and/or the second assistance function. Instead of the light sources, it is possible for light sources with at least one optical attachment to control the respective optical attachment.

The portable unit can also be designed in many different ways, depending on the application according to type and function. For example, instead of a portable unit formed as a UID, a portable unit designed as a smartphone or the like could also be used.

Further, it is conceivable that a plurality of portable units are located simultaneously in the motor vehicle environment, for example, when a number of users each with a portable unit move in the motor vehicle environment. The explanations for a single portable unit designed as a UID according to the present exemplary embodiment apply in such a case to each of the plurality of portable units, regardless of whether they are designed as a UID. The plurality of portable units can also be portable units that are different from one another, for example, two UIDs and a smartphone.

In addition to the magnetic field technology used in the exemplary embodiment for the signal exchange between the portable unit and the at least one communication interface of the motor vehicle, other suitable technologies known to the skilled artisan are also conceivable. Examples include the use of acoustic signals, the so-called UWB technology, BTLE technology, or GPS technology. Also, a combination of signal transmission technologies different from one another is possible, for example, when multiple portable units of types that are different from one another or with signal transmission technologies that are different from another are used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An method for a light control system in a motor vehicle, the light control system comprising a light controller for controlling a lighting unit in the motor vehicle for lighting a motor vehicle environment, a portable unit, at least one communication interface, and an evaluation unit for evaluating signals from the portable unit received via the communication interface, the lighting unit, in a first assistance function, being controllable by the light controller and in accordance with the evaluation of the signals received from the portable unit, such that at least one light beam emitted by the lighting unit can be positioned as a function of the position of the signals from the portable unit, the method comprising:
    manually or automatically switching on the first assistance function; and
    controlling the lighting unit via the light controller such that when the first assistance function is switched on, the light beam emitted by the lighting unit automatically tracks the portable unit in accordance with the motion trajectory of the portable unit,
    wherein the light beam emitted by the lighting unit tracks the portable unit based on the motion trajectory when the first assistance function is switched on such that the light beam is directed in front of the portable unit, to a back of the portable unit, or to an area between the portable unit and the vehicle.

2. The method according to claim 1, wherein the first assistance function is adapted to be switched off manually and/or automatically, wherein the light control system automatically switches on a second assistance function when the first assistance function is switched off.

3. The method according to claim 2, wherein, when the second assistance function is switched on, the light beam emitted by the lighting unit moves automatically as a function of the portable unit being actuated at a time that follows the switching on of the second assistance function.

4. The method according to claim 1, wherein the light beam emitted by the lighting unit moves when a second assistance function is switched on such that a carrier of the portable unit is not dazzled.

5. The method according to claim 1, wherein the signals are exchanged between the portable unit and the at least one communication interface automatically.

6. The method according to claim 5, wherein the signal exchange from the at least one communication interface to the portable unit and/or the signal exchange from the portable unit to the at least one communication interface take place based on a magnetic field technology or based on acoustic signals.

7. A light control system, the system comprising:
    a light controller for controlling a lighting unit in a motor vehicle for lighting a motor vehicle environment;
    a portable unit having a position;
    at least one communication interface; and
    an evaluation unit for evaluating signals from the portable unit received via the communication interface,
    wherein the lighting unit, in a first assistance function, is controllable by the light controller and in accordance with the evaluation of the signals received from the portable unit, such that a light beam emitted by the lighting unit is positioned in accordance with the position of the portable unit,
    wherein the first assistance function is adapted to be switched on manually and/or automatically and the light beam emitted by the lighting unit automatically tracks the portable unit when the first assistance function is switched on in accordance with a motion trajectory of the portable unit, and
    wherein the light beam emitted by the lighting unit tracks the portable unit based on the motion trajectory when the first assistance function is switched on such that the light beam is directed in front of the portable unit, to a back of the portable unit, or to an area between the portable unit and the vehicle.

8. The light control system according to claim 7, wherein the first assistance function is adapted to be switched off manually and/or automatically, and wherein a second assistance function is adapted to be switched on automatically when the first assistance function is switched off.

9. The light control system according to claim 8, wherein, when the second assistance function is switched on, the light beam emitted by the lighting unit is adapted to be moved automatically as a function of the portable unit being actuated at a time that follows the switching on of the second assistance function.

10. The light control system according to claim 7, wherein the portable unit is a UID and the lighting unit is at least one front headlight and/or at least one sidelight and/or at least one backup light of the motor vehicle.

11. A computer program product comprising instructions for causing a light control system according to carry out the steps of the method according to claim 1.

12. A computer-readable medium on which the computer program product according to claim 11 is stored.

13. The method according to claim 1, wherein the first assistance function is switched off via a control button.

14. The method according to claim 1, wherein, when the first assistance function is switched on, the lighting unit is controlled based on the motion trajectory of the portable unit relative to the vehicle, an overall light distribution around a carrier of the portable unit being tracked continuously, and
wherein, when a second assistance function is switched on, the lighting unit is controlled based on a pivoting of the portable unit about at least one axis.

15. The method according to claim 1, wherein the light beam emitted by the lighting unit moves when the first assistance function is switched on such that a carrier of the portable unit is not dazzled, an overall light distribution around the carrier being tracked continuously.

16. An method for a light control system in a motor vehicle, the light control system comprising a light controller for controlling a lighting unit in the motor vehicle for lighting a motor vehicle environment, a portable unit, at least one communication interface, and an evaluation unit for evaluating signals from the portable unit received via the communication interface, the lighting unit, in a first assistance function, being controllable by the light controller and in accordance with an evaluation of the signals received from the portable unit by the evaluation unit, such that at least one light beam emitted by the lighting unit can be positioned as a function of positions of the signals from the portable unit, the method comprising:

manually or automatically switching on the first assistance function; and controlling the lighting unit via the light controller such that, when the first assistance function is switched on, the light beam emitted by the lighting unit automatically tracks the portable unit in accordance with the motion trajectory of the portable unit, controlling the lighting unit via the light controller such that, when a second assistance function is switched on, the light beam emitted by the lighting unit is controlled by a pivoting of the portable unit about at least one axis of the portable unit.

17. The method according to claim 16, wherein pivoting about a first axis of the at least one axis directs an overall distribution of light from the lighting unit left or right, wherein pivoting about a second axis of the at least one axis directs the overall distribution of light from the lighting unit up or down, and wherein pivoting about a third axis of the at least one axis focuses or widens the overall distribution of light from the lighting unit.

* * * * *